(12) United States Patent
Kawamoto

(10) Patent No.: US 7,750,528 B2
(45) Date of Patent: Jul. 6, 2010

(54) ACTUATOR AND COIL FRAME

(75) Inventor: Hisashi Kawamoto, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/423,335

(22) Filed: Apr. 14, 2009

(65) Prior Publication Data

US 2009/0195107 A1 Aug. 6, 2009

Related U.S. Application Data

(63) Continuation of application No. PCT/JP2008/056976, filed on Apr. 9, 2008.

(30) Foreign Application Priority Data

Jun. 25, 2007 (JP) ............................. 2007-166988

(51) Int. Cl.
*H02K 3/04* (2006.01)
(52) U.S. Cl. ..................................................... 310/208
(58) Field of Classification Search ................. 310/208, 310/214, 215
See application file for complete search history.

(56) References Cited

U.S. PATENT DOCUMENTS 2,999,176 A * 9/1961 Lindstrom et al. .......... 310/215

7,489,061 B2 * 2/2009 Nishimura .................. 310/215

FOREIGN PATENT DOCUMENTS

| JP | 55-100451 | 7/1980 |
| JP | 57-183039 | 11/1982 |
| JP | 61-169479 | 10/1986 |
| JP | 2001-61268 A1 | 3/2001 |

OTHER PUBLICATIONS

International Search Report for International Application No. PCT/JP2008/056976 dated Jun. 17, 2008.

* cited by examiner

*Primary Examiner*—Hanh N Nguyen
(74) *Attorney, Agent, or Firm*—Kratz, Quintos & Hanson, LLP

(57) ABSTRACT

An actuator includes: a coil for excitation; a rotor rotatably supported; a stator effecting a magnetic force on the rotor for rotation, the stator having first and second leg portions arranged side by side; and first and second coil frames each having a body portion and a pair of flange portions provided at an end of the body portion. The first coil frame is assembled onto the first leg portion. The second coil frame is assembled onto the second leg portion. The first and second coil frames are connected via a connecting portion bendable. The body portions are arranged not to be sandwiched between the first and second leg portions. Each of the body portions covers a halfway or less of each of peripheral surfaces of the first and second leg portions of the stator.

11 Claims, 3 Drawing Sheets

ACTUATOR AND COIL FRAME

CROSS-REFERENCE TO RELATED APPLICATION

This application is a continuation of and claims priority to International Patent Application No. PCT/JP2008/056976 filed on Apr. 9, 2008, which claims priority to Japanese Patent Application No. 2007-166988 filed on Jun. 25, 2007, subject matter of these patent documents is incorporated by reference herein in its entirety.

BACKGROUND OF THE INVENTION

1. Field of the Invention

The present invention relates to an actuator and a coil frame.

2. Description of the Related Art

There has been known an actuator including: a coil for excitation; a rotor rotatably supported; a stator effecting a magnetic force on the rotor; a coil frame wound with the coil (see Japanese Unexamined Patent Application Publication No. 2001-61268)

Generally, a coil frame employed in such an actuator has a bobbin shape, and is assembled onto a leg portion of the stator.

Incidentally, the number of turns of the coil is increased, so that output of such an actuator is increased. However, as the number of turns of the coils is increased, the coil frame is lengthened and thickened. The space of the coil frame is increased, thereby increasing the size of the actuator.

SUMMARY OF THE INVENTION

It is therefore an object of the present invention to provide an actuator and a coil frame, whereby the output thereof is improved and the size thereof is suppressed from becoming larger.

According to an aspect of the present invention, there is provided an actuator including: a coil for excitation; a rotor rotatably supported; a stator effecting a magnetic force on the rotor for rotation, the stator having first and second leg portions arranged side by side; and first and second coil frames each having a body portion around which the coil is wound, and having a pair of flange portions provided at an end of the body portion, wherein the first coil frame is assembled onto the first leg portion, the second coil frame is assembled onto the second leg portion, the first and second coil frames are connected via a connecting portion bendable, and the body portions are arranged not to be sandwiched between the first and second leg portions, and each of the body portions covers a halfway or less of each of peripheral surfaces of the first and second leg portions of the stator.

With such a configuration, the coil frames are connected via the connecting portion which is bendable, thereby shortening an entire length of the coil frames, increasing the number of turns of the coil, and suppressing from becoming larger. This provides the actuator in which an output thereof is improved.

In addition, since each of the body portions cover a halfway or less of each of peripheral surfaces of the first and second leg portions of the stator, the turn diameter can be reduced. Further, the number of the turns of the coil can be increased, and the size thereof can be suppressed from becoming larger.

In addition, since the body portions are arranged not to be sandwiched between the first and second leg portions, the interference of the coil wound around the body portions with the first or second body portion can be suppressed. Further, the number of turns of the coil can be increased, and the size thereof can be suppressed from becoming larger.

According to another aspect of the present invention, there is provided a coil frame comprising: first and second coil frames each having a body portion around which a coil for excitation is wound, and having a pair of flange portions provided at an end of the body portion, wherein each of the pair of flange portions is provided with a insert hole for being inserted with a leg portion of a stator, the body portions are arranged not to be sandwiched between the leg portions, and each of the body portions covers a halfway or less of a peripheral surface of the leg portions of the stator, and the first and second coil frames are connected via a connecting portion, and are bendable, in a state in which the first and second coil frames are not assembled onto the stator, so as to be arranged in a line.

Such a configuration eliminates the necessary of assembling onto only one of the leg portions of the stator, so that the entire length of the coil frame can be shorten and the number of the turns of the coil can be increased without increasing the size. Additionally, the coil is wound around the first and second body portions which are arranged in a line, thereby providing the coil frame in which the process for winding the coil is improved.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
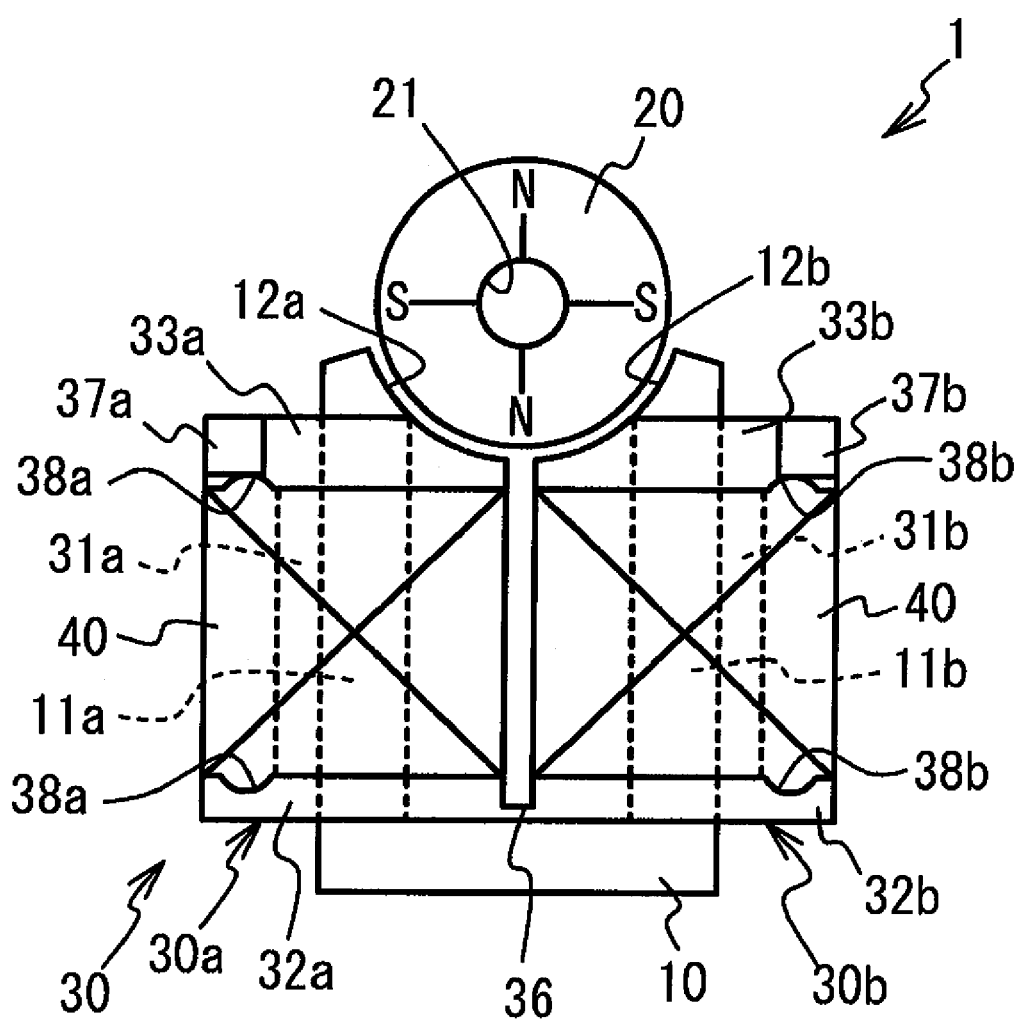
FIG. 1 is a view showing a configuration of an electromagnetic actuator according to the present embodiment.

In the following, a description will be given of an embodiment according to the present invention with reference to the drawings. FIG. 1 is a view showing a configuration of an electromagnetic actuator according to the present embodiment. The electromagnetic actuator 1 includes: a stator 10; a rotor 20; a coil frame 30 (a first coil frame and a second coil frame); and a coil 40.

The stator 10 has a U shape. The stator 10 has leg portions 11a (a first leg portion) and 11b (a second leg portion) which extend in the same direction and are arranged side by side. The ends of leg portions 11a and 11b are provided with magnetic pole portions 12a and 12b, respectively. The magnetic pole portions 12a and 12b face a peripheral surface of the rotor 20.

The peripheral surface of the rotor 20 is magnetized with four poles such that the north pole and the south pole are alternately magnetized. In addition, the rotor 20 has a hole 21 at its center, and the hole 21 is inserted with a shaft (not illustrated) supporting the rotor 20 for rotation.

The coil frame 30 is assembled onto the leg portions 11a and 11b. A coil 40 for excitation is wound around body portions 31a and 31b of the coil frame 30 together with the leg portions 11a and 11b of the stator 10, respectively. The coil 40 is made of a single coil wire.

The energization of the coil 40 causes the magnetic pole portions 12a and 12b to have different polarities, thereby working the magnetic force on the rotor 20. This effect rotates the rotor 20 by a predetermined angle.

Next, the coil frame 30 will be described in detail.

Figure 2:
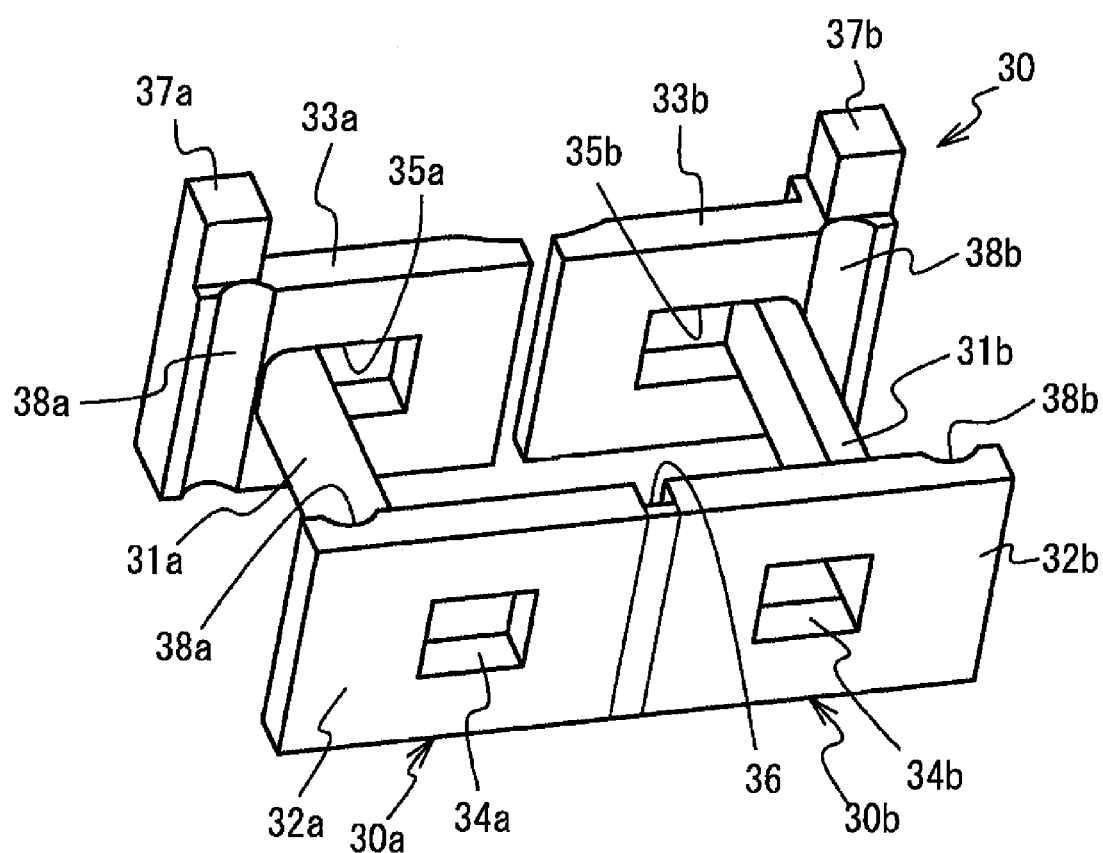
FIG. 2 is a perspective view of a coil frame.

FIG. 2 is a perspective view of the coil frame 30. The coil frame 30 is made of resin. As illustrated in FIG. 2, the coil frame 30 is composed of a first coil frame 30a and a second coil frame 30b which are parallel with each other. The first coil frame 30a includes: a body portion 31a; and flange portions 32a and 33a formed at respective ends of the body portion 31a. The second coil frame 30b includes: a body portion 31b; and flange portions 32b and 33b formed at respective ends of the body portion 31b.

The body portions 31a and 31b extend in the same direction in which the leg portions 11a and 11b of the stator 10 extend, respectively. Each of the body portions 31a and 31b dose not have a cylindrical shape, unlike a conventional coil frame. The body portions 31a and 31b are formed partially along peripheral surfaces of the leg portions 11a and 11b, respectively. The body portion 31a covers one side of the leg portion 11a having a rectangular parallelepiped shape. The body portion 31b covers one side of the leg portion 11b having a rectangular parallelepiped shape. That is, each of the body portions 31a and 31b covers a halfway or less of the each peripheral surface of the leg portions 11a and 11b, respectively. Additionally, the body portions 31a and 31b each have an I-shaped cross-section defined by the plan perpendicular to the extending direction of the body portions 31a and 31b.

Also, the flange portions 32a and 32b are provided with insert holes 34a and 34b inserted with the leg portions 11a and 11b, respectively. Likewise, the flange portions 33a and 33b are provided with insert holes 35a and 35b inserted with the leg portions 11a and 11b, respectively. The insert holes 34a, 34b, 35a, and 35b each have a rectangular shape according to each shape of the leg portions 11a and 11b. A terminal portion 37a is provided to stand at a side end portion of the flange portion 33a of the first coil frame 30a. Likewise, a terminal portion 37b is provided to stand at a side end portion of the flange portion 33b of the second coil flame 30b. The terminal portions 37a and 37b are wound with one end and other end of the coil 40, respectively. Further, the flange portions 32a and 32b are provided with a concave portion 38a, and the flange portions 33a and 33b are provided with a concave portion 38b. The concave portions 38a and 38b are located outside of the body portions 31 and 31b, respectively. The concave portions 38a and 38b extend in a longitudinal direction and each have a concave shape.

The flange portions 32a and 32b are integrally formed to have a single plate shape. At the center of flange portions 32a and 32b, a thin portion 36, which serves as a connecting portion, is provided along the longitudinal direction. The thin portion 36 has a thin shape to be bendable so that back end faces of the flange portions 32a and 32b are faced each other. Thus, as illustrated in FIG. 2, the coil frame 30 is formed such that the flange portion 32a of the first coil frame 30a and the flange portion 32b of the second coil frame 30b are connected with each other via the thin portion 36. Further, in a state in which the coil frame 30 is not assembled onto the stator 10, the first coil frame 30a and the second coil frame 30b are bendably connected with each other such that a state, in which the leg portions 11a and 11b are parallel with each other, can be shifted to a state, in which the leg portions 11 and 11b are arranged in a line with each other.

Figure 3:
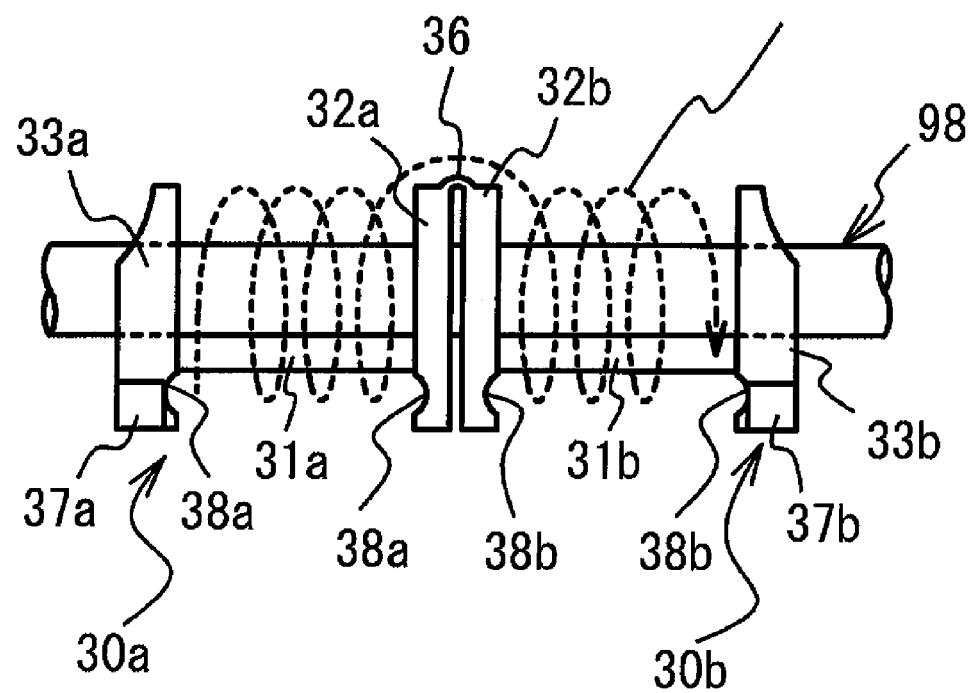
FIG. 3 is an explanatory view of the process for winding the coil around the coil frame.

Next, a description will be given of a process for winding the coil 40 around the coil frame 30. FIG. 3 is an explanatory view of the process for winding the coil 40 around the coil frame 30. First, the coil frame 30 is arranged such that a state in which the body portions 31a and 31b are parallel in a lateral direction, namely, in the direction in which the leg portions 11a and 11b are parallel with each other (as illustrated in FIG. 2). Then, the coil frame 30 is bended such that a state in which the first and second coil frames 30a and 30b are arranged in a line and back end faces of the flange portions 32a and 32b are faced each other with respect to the thin portion 36. In addition, the flange portions 32a and 32b are bended via the thin portion 36, so that the thin portion 36 tends to return to the state illustrated in FIG. 2.

When the flange portions 32a and 32b are bended to face each other by the thin portion 36, the insert holes 35b, 34b, 34a, and 35a are arranged in a line. Likewise, the body portions 31a and 31b are arranged in a line. In this state, a winding jig 98 is inserted into the insert holes 35b, 34b, 34a, and 35a. The winding jig 98 has a shape corresponding to each shape of the leg portions 11a and 11b. The winding jig 98 is inserted, so that the coil frame 30 is kept in the state illustrated in FIG. 3.

Next, the coil 40 is wound to cover the circumference of the body portion 31a and the winding jig 98. In particular, while one end of the coil 40 is wound around the terminal portions 37a provided in the flange portion 33a of the first coil frame 30a, the coil 40 is wound from the flange portion 33a toward the flange portion 32a located at the second coil frame 30b side. Then, the coil 40 is wound to stride over the thin portion 36, and the coil 40 is wound to cover the circumference of the body portion 31b of the second coil frame 30b and the winding jig 98. Next, the other end of the coil 40 is wound around the terminal portion 37b. The coil 40 is wound to stride over the thin portion 36. Even when the first coil frame 30a and the second coil frame 30b return to the state in which the first and second coil frames 30a and 30b are arranged in parallel with the leg portions 11a and 11b, the breaking of the coil 40 can be prevented. This is because the tension is not applied to the coil 40.

Additionally, the coil 40, such as a self-bonding wire, has a characteristic of keeping its shape by itself. Therefore, even when the winding jig 98 is removed after the wind of the coil 40, the coil 40 keeps its shape. When the winding jig 98 is removed, the coil 40 keeps its cylindrical shape to surround the body portions 31a and 31b, with a given space therefrom. This space is defined by the winding jig 98.

In addition, the concave portions 38a and 38b are formed to receive the thickness of the coil 40 in the extending direction of the body portions 31a and 31b, respectively. Thus, the thickness of portions, of the coil 40, facing the concave portions 38a and 38b are increased in the extending direction of the body portions 31a and 31b. As a result, the coil 40 has a shape along the concave portions 38a and 38b. Consequently, the displacement of the winded coil 40 is prevented by the concave portions 38a and 38b. In particular, in the process for winding the coil 40, the displacement of the coil 40 can be prevented, while the winding jig 98 is being removed or while the coil frame 30 is being assembled into the stator 10 since then.

Next, in the state in which the coil 40 is wound, the coil frame 30 is returned to the original state (the state illustrated in FIG. 2) by the thin portion 36. Then, the leg portion 11a is inserted into the insert holes 34a and 35a and the space defined by the coil 40, and the leg portion 11b is inserted into the insert holes 34b and 35b and the space defined by the coil 40. This allows the stator 10 to be assembled into the coil frame 30. In this manner, the process for winding the coil 40 is performed.

As mentioned above, the body portions 31a and 31b cover a halfway or less of the each peripheral surface of the leg portions 11a and 11b, respectively. With such a configuration of the body portions 31a and 31b, the winding diameter of the coil 40 is reduced. The winding diameter is reduced, whereby the number of the turns of the coil 40 is increased. This increases the ampere-turn. This increases the output of the electromagnetic actuator 1, while suppressing the increase in the size thereof.

Additionally, both the leg portions 11 and 11b can be wound with the single coil 40. The terminal portions 37a and 37b are provided at the coil frame 30 to be wound with one and the other ends of the coil 40, respectively. Therefore, four terminal portions, corresponding to two coils, are needed for in a case where the leg portions 11a and 11b are individually winded with two coils, respectively. However, according to the embodiment of the present invention, because the coil 40 is composed of a single coil, two terminal portions are simply necessary. This reduces the manufacturing cost of the coil frame 30.

Also, the body portions 31a and 31b are arranged not to be sandwiched between the leg portions 11a and 11b. That is, the body portions 31a and 31b are formed along the outer sides of the leg portions 11a and 11b, respectively. With such a configuration, a part of the coil 40, which is wound around the body portion 31a and the leg portion 11a, another part of the coil 40, which is wound around the body portion 31b and the leg portion 11b, can be prevented from interfering with each other.

As mentioned above, in the coil frame 30, when the coil 40 is wound, the thin portion 36 is bended, thereby improving the winding process of the coil 40.

The present invention is not limited to the above-mentioned embodiment, and other embodiments, variations and modifications may be made without departing from the scope of the present invention.

In the above embodiment, although the body portions 31a, 31b, and 31c each have an I-shaped cross-section, the body portions 31a, 31b, and 31c may each have an L-shaped cross-section such that adjacent two sides of the leg portions 11a and 11b are covered.

In the above embodiment, the first coil frame 30a and the second coil frame 30b are bendable by the thin portion 36 serving as the connecting portion. However, the connecting portion may have the same thickness with the flange portions 32a and 32b, and may be partially provided with a thin portion or a hole.

In the above embodiment, the terminal portion 37a is provided to stand at the first coil frame 30a, and the terminal portion 37b is provided to stand at the second coil frame 30b, and the single coil 40 is wound to be used in the actuator. However, the first and second terminal portions may be provided in each of the first and second coil frames, and the first and second terminal portions is wound with one end and the other end of the coil, respectively. The first and second coil frames may be wound with differential coils, respectively. The first and second coil frames may be assembled into different stators. In this case, the coil frame is composed of a single part, and the process for winding the coil is efficiently performed. This provides the electromagnetic actuator having good assembling ability and cost performance without increasing its size.

What is claimed is:

1. An actuator comprising:
    a coil for excitation;
    a rotor rotatably supported;
    a stator effecting a magnetic force on the rotor for rotation, the stator having first and second leg portions arranged side by side; and
    first and second coil frames each having a body portion around which the coil is wound, and having a pair of flange portions provided at an end of the body portion, wherein
    the first coil frame is assembled onto the first leg portion, the second coil frame is assembled onto the second leg portion,
    the first and second coil frames are connected via a connecting portion bendable, and
    the body portions are arranged not to be sandwiched between the first and second leg portions, and each of the body portions covers a halfway or less of each of peripheral surfaces of the first and second leg portions of the stator.

2. The actuator of claim 1 wherein each of the body portions covers one side of the first and second leg portions having rectangular parallelepiped shapes.

3. The actuator of claim 1 wherein the flange portions each have a concave portion for preventing the displacement of the coil.

4. The actuator of claim 3 wherein the body portion has an I shaped or a L shaped cross-section.

5. The actuator of claim 1 wherein the first and second coil frames are bendably connected so as to change from a state in which the first and second coil frames are arranged side by side to a state in which the first and second coil frames are arranged in a line, in a state in which the first and second coil frames are not assembled onto the stator.

6. The actuator of claim 5 wherein the body portion has an I shaped or a L shaped cross-section.

7. The actuator of claim 1 wherein the coil is a single coil wound around the first and second coil frames, a first terminal portion for winding one end of the coil is provided at one of the first and second coil frames, and a second terminal portion for winding the other end of the coil is provided in the other of the first and second coil frames.

8. The actuator of claim 7 wherein the coil is wound in a direction from one of the flange portions of the first coil frame to the other of the flange portion of the second coil frame, and strides over the connecting portion so as to be wound around the second coil frame.

9. The actuator of claim 1 wherein the body portion has an I shaped or a L shaped cross-section.

10. A coil frame comprising:
    first and second coil frames each having a body portion around which a coil for excitation is wound, and having a pair of flange portions provided at an end of the body portion,
    wherein
    each of the pair of flange portions is provided with a insert hole for being inserted with a leg portion of a stator,
    the body portions are arranged not to be sandwiched between the leg portions, and each of the body portions covers a halfway or less of a peripheral surface of the leg portions of the stator, and
    the first and second coil frames are connected via a connecting portion, and are bendable, in a state in which the first and second coil frames are not assembled onto the stator, so as to be arranged in a line.

11. The coil frame of claim 10 wherein the coil is a single coil wound around the first and second coil frames, the coil is wound in a direction from one of the flange portions of the first coil frame to the other of the flange portion of the second coil frame, the coil is strides over the connecting portion so as to be wound around the second coil frame, a first terminal portion for winding one end of the coil is provided at one of the first and second coil frames, and a second terminal portion for winding the other end of the coil is provided in the other of the first and second coil frames.

* * * * *